United States Patent
Andreasen (10) Patent No.: US 11,097,909 B2
(45) Date of Patent: Aug. 24, 2021

(54) DESTACKER WHEEL

(71) Applicant: CARSOE A/S, Aalborg (DK)

(72) Inventor: Jes Andreasen, Fjerritslev (DK)

(73) Assignee: CARSOE A/S, Aalborg (DK)

( * ) Notice: Subject to any disclaimer, the term of this patent is extended or adjusted under 35 U.S.C. 154(b) by 0 days.

(21) Appl. No.: 16/480,571

(22) PCT Filed: Jan. 24, 2018

(86) PCT No.: PCT/DK2018/050013
§ 371 (c)(1),
(2) Date: Jul. 24, 2019

(87) PCT Pub. No.: WO2018/137742
PCT Pub. Date: Aug. 2, 2018

(65) Prior Publication Data
US 2019/0359435 A1    Nov. 28, 2019

(30) Foreign Application Priority Data

Jan. 25, 2017   (DK) ........................... PA 2017 70048

(51) Int. Cl.
*B65G 59/10*   (2006.01)
*B65G 59/06*   (2006.01)

(52) U.S. Cl.
CPC ......... *B65G 59/108* (2013.01); *B65G 59/066* (2013.01)

(58) Field of Classification Search
CPC .. B65G 59/066; B65G 59/102; B65G 59/107; B65G 59/108; B65G 59/10; B65B 43/42
(Continued)

(56) References Cited

U.S. PATENT DOCUMENTS 2,595,013 A * 4/1952 Smith ................. B65G 59/108
198/467.1
3,198,382 A * 8/1965 Clearly ............... B65G 59/108
221/222
(Continued)

FOREIGN PATENT DOCUMENTS

CN       201305366 Y     9/2009
DK       178264 B1 * 10/2015 ........... B65G 59/108
(Continued)

OTHER PUBLICATIONS

International Preliminary Report on Patentability dated Jul. 30, 2019 in International Application No. PCT/DK18/50013.

*Primary Examiner* — Rakesh Kumar
(74) *Attorney, Agent, or Firm* — Berg Hill Greenleaf Ruscitti, LLP (57) ABSTRACT

A destacker wheel is provided for a denester where a stack of containers is destacked, one by one, by rotating or partly rotating the destacker wheel about an axis parallel to the stack of containers. The destacker wheel comprises a stack carrying surface for carrying the stack of containers connected to an inclined surface. A slit orthogonal to a rotation axis is provided between the carrying surface and the inclined surface. The slit has a height in a direction of the rotation axis corresponding to the thickness of a flange of the containers. An ejector surface follows below and at least partly behind the inclined surface in the direction of rotation. The ejector surface commences with an edge arranged substantially radially to the axis of rotation. The edge is above the level of the slit. The inclined surface has a side surface between the inclined surface and the slit.

10 Claims, 5 Drawing Sheets

(58) Field of Classification Search
USPC .......................................................... 221/222
See application file for complete search history.

(56) References Cited

U.S. PATENT DOCUMENTS

| | | | | | |
|---|---|---|---|---|---|
| 3,426,941 | A | * | 2/1969 | Hovekamp | B65H 3/28 |
| | | | | | 221/222 |
| 3,741,410 | A | * | 6/1973 | Henschke | B65G 59/108 |
| | | | | | 414/795.6 |
| 3,840,150 | A | * | 10/1974 | Kinney | B65G 59/108 |
| | | | | | 221/222 |
| 3,958,720 | A | * | 5/1976 | Anderson | B65G 59/108 |
| | | | | | 221/93 |
| 4,048,915 | A | * | 9/1977 | Martin | B65G 59/108 |
| | | | | | 101/35 |
| 4,180,180 | A | * | 12/1979 | Fries, Jr. | B65G 59/108 |
| | | | | | 221/1 |
| 4,288,003 | A | * | 9/1981 | Fries, Jr. | B65G 59/108 |
| | | | | | 221/1 |
| 4,804,108 | A | * | 2/1989 | Ficken | A47F 1/085 |
| | | | | | 221/223 |
| 2019/0359435 | A1 | * | 11/2019 | Andreasen | B65G 59/108 |

FOREIGN PATENT DOCUMENTS

| | | | | |
|---|---|---|---|---|
| EP | 3511273 A1 | * | 7/2019 | ........... B65G 59/108 |
| FR | 2477120 A | | 9/1981 | |
| JP | S57129001 U | | 8/1982 | |
| JP | H0346426 U | | 4/1991 | |
| WO | WO-9812130 A1 | * | 3/1998 | ........... B65G 59/108 |
| WO | 2005044703 A1 | | 5/2005 | |
| WO | 2009150755 A1 | | 12/2009 | |
| WO | WO-2015028022 A1 | * | 3/2015 | ........... B65G 59/108 |
| WO | 2016034179 A1 | | 3/2016 | |
| WO | WO-2016034179 A1 | * | 3/2016 | ........... B65G 59/108 |

* cited by examiner

DESTACKER WHEEL

FIELD OF THE INVENTION

The present invention relates to a destacker wheel for use in a denester as well as a dispenser for dispensing containers using such a destacker wheel and furthermore a method of dispensing a container from a stack of identical containers by use of such a destacker wheel.

BACKGROUND OF THE INVENTION

In production lines and particularly in production lines in the food industry it is quite normal to provide for example meat in plastic containers which after having been filled with meat is sealed by welding a clear plastic film on top of the container.

Such containers are provided with a flange which will provide adequate surface area in order to fasten the cover film in a manner such that for example a sealed atmosphere may be present inside the container.

These containers are used for a wide variety of foodstuffs, but also for other products. Common for this type of packaging is the fact that the containers are typically blow-moulded or injection-moulded and are provided with a flange along the upper periphery of the opening to the container.

In the art a wide variety of apparatuses has been developed in order to dispense this type of containers from a stack of substantially identical containers.

Examples of this are known from for example WO2005/044703 and EP2186760. From these prior art documents denesting apparatuses are known where destacker wheels engage the lowermost container in the stack and at the same time retain the stack of containers at a certain level whereas by further rotation of the destacker wheel the lowermost container from the stack is freed from the stack and allowed to be transported to a filling station.

A further example is disclosed in JPS 57129011U wherein a destacker wheel having a groove is illustrated. The groove has an opening with an edge and an inclined surface such that containers having a flange, will be dispensed or de-stacked. The de-stacking occurs because the flange is caught by the groove in the destacker wheel and as the destacker wheel rotates, the shape of the groove will direct the flange of the container away from the remaining stack of containers.

The principle used in the above-mentioned prior art documents and in many other similar prior art documents is based on the fact that the containers are provided with a relatively wide flange, i.e. the flange extends a certain distance away from the container such that it is possible by the destacker wheels to firmly engage these flanges in order to separate the lowermost container from the stack of containers.

In many other situations the containers have very narrow flanges and the containers are stacked very closely together such that it is very difficult for the traditional denester devices and destacking wheels to reliably engage and separate one container at a time during a high speed production process. In these instances it has been suggested to arrange the destacking wheel at an angle relative to the stack of containers. The mechanical construction relating to synchronising three or four axles which are not parallel, but must operate completely in sync is very difficult and is much more costly than the traditional construction where three, four or more axles are activated synchronously and where the axles are arranged in parallel. Such a construction makes it possible to use traditional constructional measures with a high degree of reliability.

OBJECT OF THE INVENTION

Consequently, it is an object of the present invention to provide a destacker wheel, a dispenser as well as a method of dispensing using such a destacker wheel where the drive axles are parallel to the stack of container, but where enhanced engagement means are provided such that even for containers having a minimal flange and being stacked very closely a high reliability of separation, even at high production speed, may be achieved.

DESCRIPTION OF THE INVENTION

The invention addresses this by providing a destacker wheel for a denester, where a stack of containers, each container having a flange along its perimeter is to be destacked one by one which destacker wheel is particular in that by rotating or partly rotating said destacker wheel about an axis parallel to said stack of containers, where said destacker wheel comprises:
- a stack carrying surface for carrying said stack of containers, connected to
- a inclined surface, where between the carrying surface and the inclined surface a slit orthogonal to the rotation axis is provided, said slit having a height in the direction of the rotation axis corresponding at least to the thickness of a containers flange, and
- where an ejector surface follows below and at least partly behind the inclined surface in the direction of rotation, where said ejector's surface commences with an edge, said edge arranged substantially radially with respect to the axis of rotation, where said edge is above the level of the slit, and
- where the inclined surface has a side surface between said inclined surface and the slit, where said surface diverges outwards upwards from said slit relative to the axis of rotation.

The inclined surface's side surface is arranged such that it converges outwards from the slit. In this manner, as the destacker wheel is rotated, it is possible reliably to engage the next container in the stack of containers in a reliable manner without having to tilt the axle around which the destacker wheel is rotating. Due to the fact that the destacker wheel in this configuration corresponding to the side surface of the inclined side surface is conically shaped makes it possible to get closer to the stack of containers whereby the separation of the lowermost container is ensured.

In a still further advantageous embodiment of the invention the side surface is linear. Although there is an interest in providing as much space under the inclined surface as possible, it is also important to guide and retain the stack of containers in as stable a configuration as possible, and by providing the side surface as a linear surface, i.e. straight lines connecting the lower rim to the upper rim of the surface, the impact on the stack of containers from the destacking wheel is substantially constant such that vibrations transferred from the destacker wheel to the stack of containers is avoided.

In a still further advantageous embodiment the radius of the carrying surface is larger than the radius of the inclined surface. This feature foresees that the carrying surface and thereby the surface which carries the entire stack of containers extends as much as possible under the flange and at the same time the flange is allowed to engage the slit and the inclined surface thereby separating the lowermost container from the stack as already discussed above.

In a further advantageous embodiment the side surface has an upper limitation and a lower limitation relative to the stack of containers, where the radius of the upper limitation with respect to the rotation axis is larger than the radius of the lower limitation.

With this embodiment it is foreseen that the side surface converges outwards upwards, i.e. from the lower limitation to the upper limitation. At the same time it is clear that the side surface will be given a semi-circular geometry such that the surface will substantially be in contact with the flange of the containers during the entire movement of the destacker wheel along the stack of containers during engagement.

The destacker wheel may rotate in one direction during use in a further embodiment. This foresees that the destacker wheel rotates continuously around the axles in the same direction such that the different surfaces, i.e. carrying surface, inclined surface and ejector surface may be designed such that by one full revolution of the destacker wheel a container is separated from the stack of containers.

The inventive destacker wheel may also in a further embodiment be designed to change directions such that it reciprocates back and forth in a semicircular movement corresponding to an angle of movement of 35-200 degrees, more preferred from 45-120 degrees. In practice the reciprocating movement may be controlled by step motors which are very accurate and very fast acting such that a very high dispensing speed and thereby production speed may be achieved.

The angular preferences are selected such that sufficient surface length of the various surfaces, during rotation is provided in order to effectively engage, isolate and separate the flanges of the containers due to the flange's engagement with the carrying surface, inclined surface and ejector surface respectively. It is clear that with the narrow, angular rotation of the destacker wheel it is possible to separate the containers faster, for example if the denesting can be achieved at a 45 degrees angle a rotation corresponding to 90 degrees, i.e. 45 degrees one way and 45 degrees return, is faster than rotating the entire wheel 360 degrees as is the case in the embodiment mentioned above. On the other hand, this requires that a very firm and reliable engagement is achieved by the destacker wheel in contact with the stack of containers to be dispensed.

As is the case with the angular movement to ensure denesting (separation of a container from the stack of containers) the diameter of the wheel also has influence. The larger the wheel the more surface area is available for support and movement. On the other hand it is also in some embodiments desirable to arrange the axles as close to the containers as possible, and in these embodiments smaller diameter wheels are used. The smaller diameter wheels also have less mass and may therefore be accelerated and de-accelerated faster, making faster denesting possible. The preferred diameters for destacker wheels according to the invention are between 30 mm to 120 mm.

Traditionally these types of de-stacker wheels are made from steel or stainless steel. It is however also contemplated to manufacture the destacker wheels according to the invention from other suitable materials such as for example—but not limiting to aluminum, ceramics, modified fiber-reinforced plastics, and various strong and light alloys.

In this connection the design of the flange is naturally very important, but as the design of the flange is not carried out by the designer of the destacker wheel sufficient care should be provided in designing the destacker wheel such that a reliable function is achieved.

The invention is also directed at a dispenser for dispensing containers in a predetermined direction incorporating a destacker wheel as described above where the dispenser is particular in that it is suitable to dispense containers of the type having a flange extending outwards from an upper periphery of the container, wherein a stack of substantially identical containers are arranged in a de-stacking device, and where one or more parallel rotating axles are provided adjacent the stack of containers, such that one or more de-stacker wheels as disclosed above engages the stack of containers.

Naturally, the dispenser achieves the same advantages with the destacker wheel discussed above.

The invention is also directed at a method of dispensing a container from a stack of identical containers which is particular in that the containers of the type having a flange extending from the periphery of the container, where the containers are arranged in a de-stacking device where one or more parallel rotating axles are provided adjacent the stack of containers, and a destacker wheel according to any of claims 1 to 6 is arranged on each rotating axle, where the destacker wheel engages the stack of containers, such that the stack of containers is retained on the de-stacker wheels' carrying surface, and as the de-stacker wheel is rotated the flange of the lowermost container enters the slit, and the flange of the second lowermost container slides on the inclined surface, and after further rotation the edge of the ejector surface forces the container downwards and free relative to the stack.

Likewise, the method will also enjoy the advantages of the destacker wheel as well as the dispenser as discussed above.

DESCRIPTION OF THE DRAWING

The invention will now be described with reference to the accompanying drawing wherein.

DETAILED DESCRIPTION OF THE INVENTION

Figure 1:
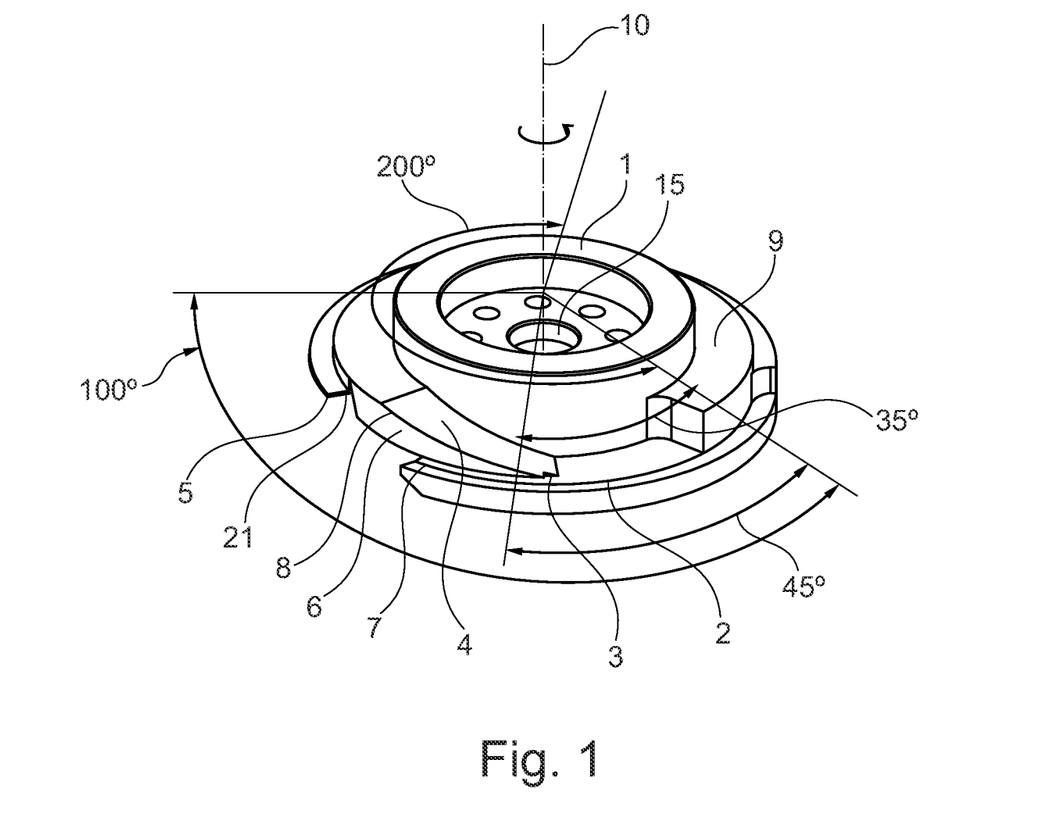
FIG. 1 illustrates a destacker wheel
Figure 1A:
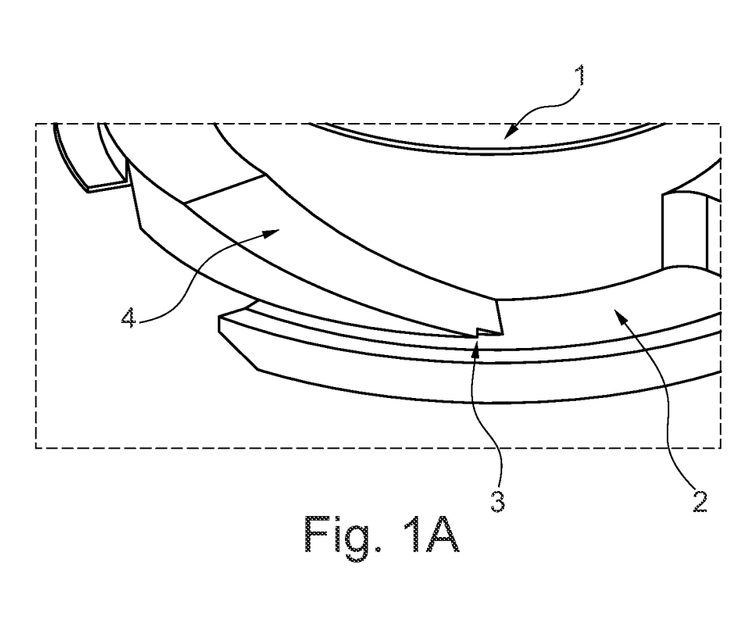
FIG. 1A is an enlarged fragmentary view of a lower portion of FIG. 1.

In FIG. 1 is illustrated a destacker wheel 1 according to one embodiment of the invention. The destacker wheel 1 is adapted to rotate around the axis 10, for example by mounting an axle (not illustrated) in the aperture 15.

Figure 2:
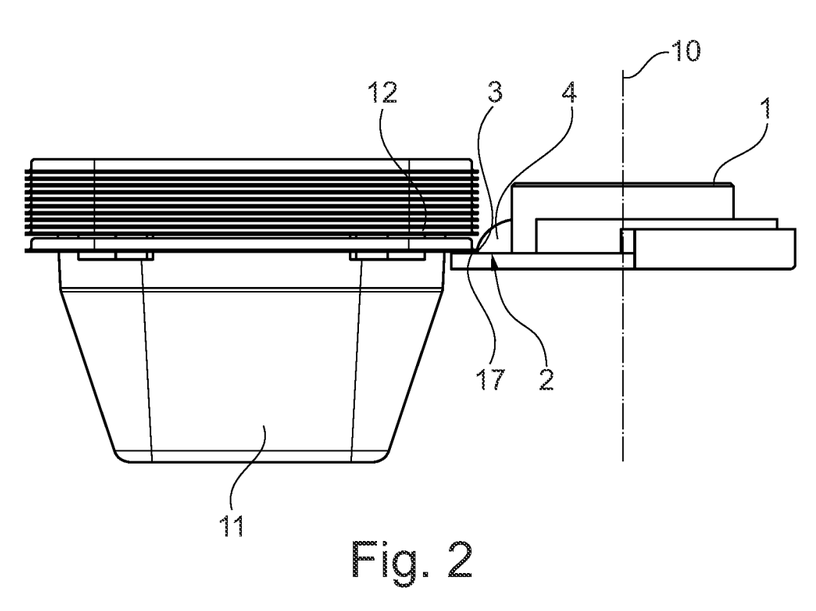
FIGS. 2, 3 and 4 illustrate various stages in the separation of a container from a stack of containers
Figure 3:
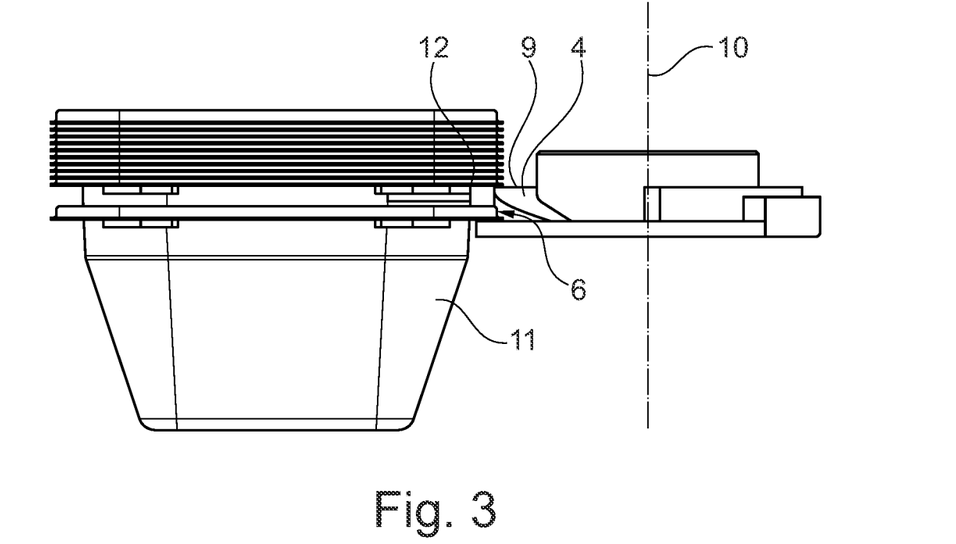
Figure 4:
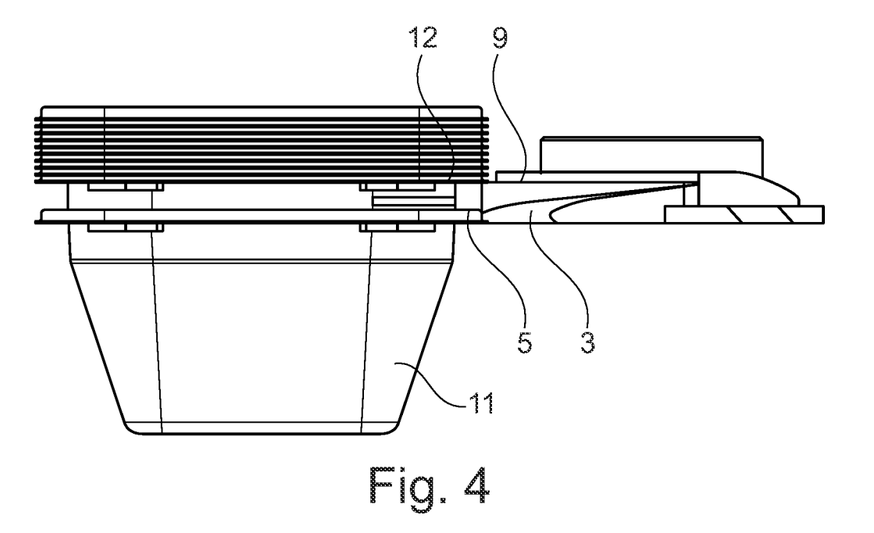

The destacker wheel 1 is provided with a carrying surface 2 which carrying surface 2 is designed to carry the stack of containers 11,12 (see FIGS. 2, 3 and 4).

Figure 5:
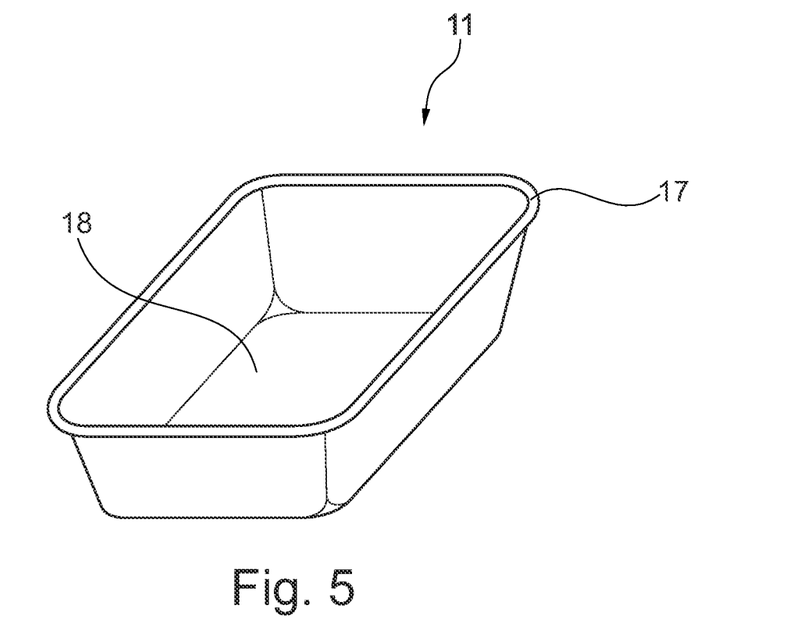
FIG. 5 illustrates a container
Figure 6A:
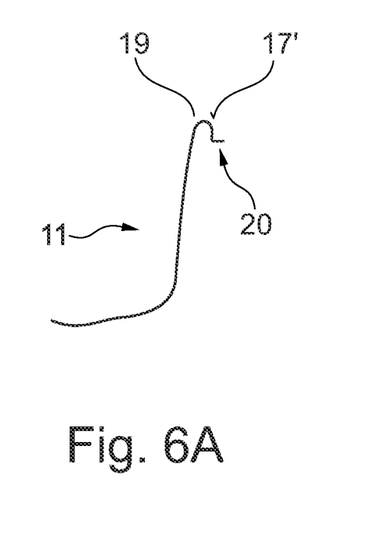
FIGS. 6a and 6b illustrate various flange constructions
Figure 6B:
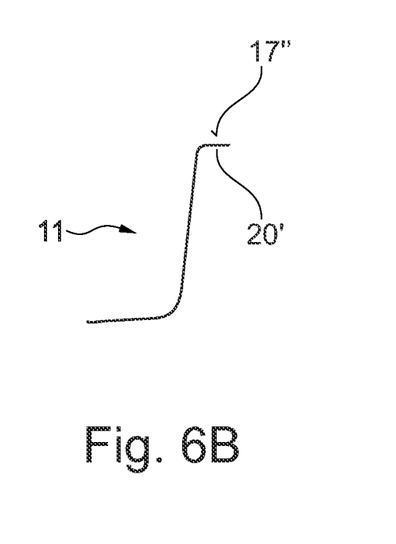

Turning briefly to FIGS. 5 and 6a and 6b it is important to understand the type of containers 11 to which the invention is directed. In FIG. 5 is schematically illustrated a container 11 which is suitable to be handled by a destacker wheel according to the present invention. The container is provided with a flange 17 extending outwards along its upper perimeter surrounding the cavity 18 of the container 11. In FIGS. 6a and 6b are illustrated two examples of flange constructions 17', 17". As indicated in FIG. 6*a* the flange 17' may be provided with a bent section 19 and a flat section 20.

The flange construction illustrated in FIG. 6*b* only has a flat section 20'. The important thing is that the destacker wheel is able to interface with the container 11 by interacting with the flat section 20, 20' or other similar flange constructions which may be desirable, but which do have a substantially flat section.

Turning back to FIG. 1 the flange 17 of the container 11 (see FIGS. 2-6*b*) will be resting on the carrying surface 2. As the wheel 1 turns, the lowermost container 11 in a stack of containers 12 will have its flange 17 and in particular the flat section 20, 20' enter into the slit 3 provided between the inclined surface 4 and the carrying surface 2. The inclined surface 4 will on the other hand elevate the stack 12 of containers as the wheel 1 rotates and the stack of containers 12 is forced up the inclined surface 4, whereas the lowermost container 11 is detained by the slit 3 in a lower position.

As the wheel continues its rotation indicated by the arrow 16 the flange 17 of the lowermost container 11 will be urged further downwards by the ejector surface 5 where the edge 21 of the ejector surface 5 is arranged substantially radially with respect to the rotation axis 10 such that a clear and decisive interaction with the flange 17 is ensured thereby pushing the lowermost container 11 downwards.

At this point the stack of containers 12 has been forced up the inclined surface 4 and has arrived at a higher level on a secondary carrying surface 9. As the wheel 1 continues its rotation 16, the remaining stack of containers 12 will fall from the secondary carrying surface 9 onto the carrying surface 2 preparing for separating/dispensing a further container 11 as already discussed above.

With respect to the FIGS. 2, 3 and 4 the above-mentioned workings of the destacker wheel with respect to dispensing a container are illustrated in a stepwise manner.

In FIG. 2 the stack of containers 12 is arranged in a vertical stack parallel to the rotation axis 10 of the destacker wheel 1. In the position illustrated in FIG. 2 the flange 17 of the lowermost container 11 has just entered the slit 3. In order to facilitate a reliable engagement with the flange 17 of the container 11 the side face 6 of the inclined surface 4 is specifically designed to make more space allowing for reliable grip of the flange. As clearly seen in FIG. 3 the side face 6 converges outwards upwards relative to the rotation axis 10. That is to say that the distance from the rotation axis 10 to the lower limitation 7 (see FIG. 1) of the side face 6 is shorter than the radius to the upper limitation 8 (see FIG. 1). Therefore, is it possible to allow the flange 17 to get closer to the rotation axis 10 thereby having a firmer engagement first with the carrying surface 2 and thereafter still supported by part of the carrying surface adjacent the slit 3 such that a stable engagement with the stack of containers 12 is achieved.

As the wheel rotates from the position depicted in FIG. 2, the stack of containers will as illustrated in FIG. 3 travel up the inclined surface 4 and arrive at the upper secondary carrying surface 9.

At the same time the lowermost container 11 will have been retained by the container's 11 flange being held by the slit 3 such that as illustrated in FIG. 3 the lowermost container 11 is separated from the remaining stack of containers 12.

As the wheel 1 rotates further, the stack of containers 12 is still carried by the secondary carrying surface 9 whereas the lowermost container engages the ejector surface 5 whereby the lowermost container 11 is urged further downwards and completely separated from the stack of containers 12.

By providing the side face 6, see FIG. 1, as an oblique surface with respect to the rotation axis, that is to say that the radius from the rotation axis to the lower limitation 7 is shorter than the radius from the rotation axis 10 to the upper limitation 8 of the side face 6, it is achieved that even containers having very narrow flanges (see FIG. 5) may be handled by the destacking wheel according to the present invention. This is facilitated by the carrying surface 2 effectively supporting the stack of containers 12 and the combination of the slit 3 together with the inclined surface 4 effectively separating one container 11 from the stack of containers 12. At the same time, due to the design of the side face 6, the support for both the separated container 11 and the stack of containers 12, see for example FIG. 3, is stable and reliable and an effective destacking is achieved.

The invention claimed is:

1. A destacker wheel for a denester suitable to destack a stack of containers, said destacker wheel rotating or partly rotating about a rotation axis parallel to said stack of containers, wherein said destacker wheel comprises:
    a stack carrying surface for carrying said stack of containers, said stack carrying surface connected to an inclined surface wherein between the stack carrying surface and the inclined surface, a slit is provided orthogonal to the rotation axis;
    wherein an ejector surface follows below and at least partly behind the inclined surface in a direction of rotation, wherein said ejector's surface commences with an edge, said edge arranged substantially radially with respect to the rotation axis, wherein said edge is above a level of the slit, and
    wherein the inclined surface has a side surface between the inclined surface and the slit, and wherein said side surface has a lower limitation and an upper limitation, wherein said side surface diverges outwards and upwards from said slit relative to the rotation axis so that a distance from the rotation axis to the lower limitation of the side surface is shorter than a radius to the upper limitation of the side surface.

2. The destacker wheel according to claim 1 wherein the side surface is linear.

3. The destacker wheel according to claim 1 wherein a largest radius of the stack carrying surface is larger than a largest radius of the inclined surface.

4. The destacker wheel according to claim 1 wherein the side surface has an upper limitation and a lower limitation relative to the stack of containers, wherein a largest radius of the upper limitation with respect to the rotation axis is larger than a largest radius of the lower limitation.

5. The destacker wheel according to claim 1 wherein the wheel is able to rotate in one direction during use.

6. The destacker wheel according to claim 1 wherein the wheel in use is able to reciprocate back and forth in a semi-circular movement corresponding to an angular movement of from 35 to 200 degrees, more preferred from 45 to 100 degrees.

7. The destacker wheel according to claim 1 wherein a diameter of the destacker wheel is between 30 mm to 120 mm.

8. The destacker wheel according to claim 1 wherein the slit provided orthogonal to the rotation axis has a height in a direction of the rotation axis between 0.05 mm to 2 mm.

9. A destacker wheel according to claim 1 wherein the slit provided orthogonal to the rotation axis has a height in the direction of the rotation axis between 0.2 mm to 1 mm.

10. A destacker wheel according to claim 1 wherein the slit provided orthogonal to the rotation axis has a height in the direction of the rotation axis between 0.25 mm to 0.5 mm.

* * * * *